United States Patent
Chau

(10) Patent No.: US 7,401,156 B2
(45) Date of Patent: Jul. 15, 2008

(54) METHOD USING CONTROL INTERFACE TO SUSPEND SOFTWARE NETWORK ENVIRONMENT RUNNING ON NETWORK DEVICES FOR LOADING AND EXECUTING ANOTHER SOFTWARE NETWORK ENVIRONMENT

(75) Inventor: Tony Ka Wai Chau, Loughton (GB)

(73) Assignee: JP Morgan Chase Bank, New York, NY (US)

( * ) Notice: Subject to any disclaimer, the term of this patent is extended or adjusted under 35 U.S.C. 154(b) by 837 days.

(21) Appl. No.: 10/446,912

(22) Filed: May 23, 2003

(65) Prior Publication Data

US 2004/0153535 A1 Aug. 5, 2004

Related U.S. Application Data

(60) Provisional application No. 60/444,973, filed on Feb. 3, 2003.

(51) Int. Cl.
*G06F 15/16* (2006.01)
(52) U.S. Cl. .................. 709/237; 709/248; 709/220
(58) Field of Classification Search ............ 713/1, 713/2; 710/302, 58; 709/237, 239, 220, 709/248; 434/322; 370/528
See application file for complete search history.

(56) References Cited

U.S. PATENT DOCUMENTS

| | | | |
|---|---|---|---|
| 4,751,702 A | 6/1988 | Beier et al. | |
| 5,027,269 A | 6/1991 | Grant et al. | |
| 5,075,881 A | 12/1991 | Blomberg et al. | |
| 5,301,320 A | 4/1994 | McAtee et al. | |
| 5,313,616 A | 5/1994 | Cline et al. | |
| 5,325,527 A | 6/1994 | Cwikowski et al. | |
| 5,347,518 A | 9/1994 | Lee | |
| 5,386,551 A | 1/1995 | Chikira et al. | |

(Continued)

FOREIGN PATENT DOCUMENTS

WO 01/35209 5/2001

(Continued)

OTHER PUBLICATIONS

Thomas; Enterprise Javabeans(TM) Technology: Server Component Model for the Java(TM) Platform, Java.Sun.Com, May 2, 1999.

(Continued)

*Primary Examiner*—Le Luu
(74) *Attorney, Agent, or Firm*—Lowenstein Sandler PC

(57) ABSTRACT

According to the inventive method, a network, including its software environment, is suspended in a manner that completely preserves the previous running environment and frees the network to perform other tasks for a period of time, and then to resume the original test as if it had never been interrupted. The method suspends a computer network that is running a test of a first software environment. It suspends the first software environment by a software suspension and then runs a second software environment on the computer network. At the completion of the run of the second software environment, the first software environment can be resumed, as if it had not been interrupted. A sequence of steps allows for the orderly shutdown and persists the entire network's operating state at the time of suspension.

7 Claims, 4 Drawing Sheets

U.S. PATENT DOCUMENTS

| | | |
|---|---|---|
| 5,446,895 A | 8/1995 | White et al. |
| 5,499,371 A | 3/1996 | Henninger et al. |
| 5,539,885 A | 7/1996 | Ono et al. |
| 5,549,117 A | 8/1996 | Tacklind et al. |
| 5,553,235 A | 9/1996 | Chen et al. |
| 5,563,998 A | 10/1996 | Yakish et al. |
| 5,566,297 A | 10/1996 | Devarakonda et al. |
| 5,594,863 A | 1/1997 | Stiles |
| 5,630,047 A | 5/1997 | Wang |
| 5,630,069 A | 5/1997 | Flores et al. |
| 5,630,173 A | 5/1997 | Oprescu |
| 5,655,074 A | 8/1997 | Rauscher |
| 5,673,403 A | 9/1997 | Brown et al. |
| 5,689,698 A | 11/1997 | Jones et al. |
| 5,692,181 A | 11/1997 | Anand et al. |
| 5,701,471 A | 12/1997 | Subramanyam |
| 5,712,971 A | 1/1998 | Stanfill et al. |
| 5,717,925 A | 2/1998 | Harper et al. |
| 5,721,913 A | 2/1998 | Ackroff et al. |
| 5,721,914 A | 2/1998 | DeVries |
| 5,732,262 A | 3/1998 | Gillespie et al. |
| 5,734,887 A | 3/1998 | Kingberg et al. |
| 5,737,592 A | 4/1998 | Nguyen et al. |
| 5,748,878 A | 5/1998 | Rees et al. |
| 5,752,034 A | 5/1998 | Srivastava et al. |
| 5,758,061 A | 5/1998 | Plum |
| 5,761,499 A | 6/1998 | Sonderegger |
| 5,768,119 A | 6/1998 | Havekost et al. |
| 5,768,506 A | 6/1998 | Randell |
| 5,781,448 A | 7/1998 | Nakamura et al. |
| 5,784,557 A | 7/1998 | Oprescu |
| 5,784,562 A | 7/1998 | Diener |
| 5,790,809 A | 8/1998 | Holmes |
| 5,799,297 A | 8/1998 | Goodridge et al. |
| 5,801,689 A | 9/1998 | Huntsman |
| 5,802,367 A | 9/1998 | Held et al. |
| 5,806,075 A | 9/1998 | Jain et al. |
| 5,815,415 A | 9/1998 | Bentley et al. |
| 5,828,883 A | 10/1998 | Hall |
| 5,835,770 A | 11/1998 | Shum et al. |
| 5,842,196 A | 11/1998 | Agarwal et al. |
| 5,845,292 A | 12/1998 | Bohannon et al. |
| 5,872,976 A | 2/1999 | Yee et al. |
| 5,884,037 A | 3/1999 | Aras et al. |
| 5,889,992 A | 3/1999 | Koerber |
| 5,899,990 A | 5/1999 | Maritzen et al. |
| 5,903,721 A | 5/1999 | Sixtus |
| 5,903,897 A | 5/1999 | Carrier, III et al. |
| 5,920,719 A | 7/1999 | Sutton et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,949,412 A | 9/1999 | Huntsman |
| 5,960,196 A | 9/1999 | Carrier, III et al. |
| 5,960,200 A | 9/1999 | Eager et al. |
| 5,960,445 A | 9/1999 | Tamori et al. |
| 5,987,247 A | 11/1999 | Lau |
| 5,995,965 A | 11/1999 | Experton |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,026,237 A | 2/2000 | Berry et al. |
| 6,028,938 A | 2/2000 | Malkin et al. |
| 6,029,002 A | 2/2000 | Afifi et al. |
| 6,046,742 A | 4/2000 | Chari |
| 6,052,456 A | 4/2000 | Huang |
| 6,058,393 A | 5/2000 | Meier et al. |
| 6,061,503 A | 5/2000 | Chamberlain |
| 6,061,686 A | 5/2000 | Gauvin et al. |
| 6,065,009 A | 5/2000 | Leymann et al. |
| 6,067,412 A | 5/2000 | Blake et al. |
| 6,073,107 A | 6/2000 | Minkiewicz et al. |
| 6,083,276 A | 7/2000 | Davidson et al. |
| 6,088,700 A | 7/2000 | Larsen et al. |
| 6,101,489 A | 8/2000 | Lannert et al. |
| 6,101,601 A | 8/2000 | Matthews et al. |
| 6,105,089 A * | 8/2000 | Chari et al. ................. 710/302 |
| 6,108,673 A | 8/2000 | Brandt et al. |
| 6,108,698 A | 8/2000 | Tenev et al. |
| 6,125,390 A | 9/2000 | Touboul |
| 6,128,708 A | 10/2000 | Fitzpatrick et al. |
| 6,138,112 A | 10/2000 | Slutz |
| 6,145,121 A | 11/2000 | Levy et al. |
| 6,148,296 A | 11/2000 | Tabbara |
| 6,163,776 A | 12/2000 | Periwal |
| 6,167,534 A | 12/2000 | Straathof et al. |
| 6,173,439 B1 | 1/2001 | Carlson et al. |
| 6,175,833 B1 | 1/2001 | West et al. |
| 6,178,409 B1 | 1/2001 | Weber et al. |
| 6,184,996 B1 | 2/2001 | Gase |
| 6,185,613 B1 | 2/2001 | Lawson et al. |
| 6,195,676 B1 | 2/2001 | Spix et al. |
| 6,226,684 B1 | 5/2001 | Sung et al. |
| 6,230,319 B1 | 5/2001 | Britt, Jr. et al. |
| 6,237,035 B1 | 5/2001 | Himmel et al. |
| 6,237,143 B1 | 5/2001 | Fontana et al. |
| 6,243,862 B1 | 6/2001 | Lebow |
| 6,246,410 B1 | 6/2001 | Bergeron et al. |
| 6,247,029 B1 | 6/2001 | Kelley et al. |
| 6,249,877 B1 | 6/2001 | Kawakami et al. |
| 6,253,193 B1 | 6/2001 | Ginter et al. |
| 6,269,479 B1 | 7/2001 | Puram |
| 6,272,556 B1 | 8/2001 | Gish |
| 6,279,039 B1 | 8/2001 | Bhat et al. |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,292,933 B1 | 9/2001 | Bahrs et al. |
| 6,298,353 B1 | 10/2001 | Apte |
| 6,301,701 B1 | 10/2001 | Walker et al. |
| 6,304,871 B1 | 10/2001 | Gajda et al. |
| 6,311,327 B1 | 10/2001 | O'Brien et al. |
| 6,314,430 B1 | 11/2001 | Chang |
| 6,317,738 B1 | 11/2001 | Lohman et al. |
| 6,324,525 B1 | 11/2001 | Kramer et al. |
| 6,324,619 B1 | 11/2001 | Raverdy et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,363,524 B1 | 3/2002 | Loy |
| 6,381,609 B1 | 4/2002 | Breitbart et al. |
| 6,405,250 B1 | 6/2002 | Lin et al. |
| 6,405,364 B1 | 6/2002 | Bowman-Amuah |
| 6,411,910 B1 | 6/2002 | Eulau et al. |
| 6,424,981 B1 | 7/2002 | Isaac et al. |
| 6,430,556 B1 | 8/2002 | Goldberg et al. |
| 6,430,687 B1 * | 8/2002 | Aguilar et al. ................. 713/2 |
| 6,438,749 B1 | 8/2002 | Chamberlain |
| 6,442,533 B1 | 8/2002 | Hinkle |
| 6,442,748 B1 | 8/2002 | Bowman-Amuah |
| 6,446,126 B1 | 9/2002 | Huang et al. |
| 6,453,127 B2 | 9/2002 | Wood et al. |
| 6,463,343 B1 | 10/2002 | Emens et al. |
| 6,463,439 B1 | 10/2002 | Dahlberg |
| 6,463,454 B1 | 10/2002 | Lumelsky et al. |
| 6,466,980 B1 | 10/2002 | Lumelsky et al. |
| 6,467,052 B1 | 10/2002 | Kaler et al. |
| 6,467,079 B1 | 10/2002 | Ettritch et al. |
| 6,470,384 B1 | 10/2002 | O'Brian et al. |

| | | |
|---|---|---|
| 6,470,464 B2 | 10/2002 | Bertram et al. |
| 6,473,786 B1 | 10/2002 | Scouras et al. |
| 6,477,471 B1 | 11/2002 | Hedstrom et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przbylski et al. |
| 6,502,095 B2 | 12/2002 | Breitbart et al. |
| 6,502,207 B1 | 12/2002 | Itoh et al. |
| 6,505,176 B2 | 1/2003 | DeFrancesco, Jr. et al. |
| 6,505,238 B1 | 1/2003 | Tran |
| 6,510,352 B1 | 1/2003 | Badavas et al. |
| 6,513,154 B1 | 1/2003 | Porterfield |
| 6,518,983 B1 | 2/2003 | Grohmann et al. |
| 6,519,763 B1 | 2/2003 | Kaufer et al. |
| 6,526,443 B1 | 2/2003 | Goldsmith et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,546,506 B1 | 4/2003 | Lewis |
| 6,553,428 B1 | 4/2003 | Ruehle et al. |
| 6,557,039 B1 | 4/2003 | Leong et al. |
| 6,560,580 B1 | 5/2003 | Fraser et al. |
| 6,571,282 B1 | 5/2003 | Bowman-Amuah |
| 6,571,389 B1 | 5/2003 | Spyker et al. |
| 6,578,004 B1 | 6/2003 | Cimral et al. |
| 6,578,006 B1 | 6/2003 | Saito et al. |
| 6,578,068 B1 | 6/2003 | Bowman-Amuah |
| 6,584,447 B1 | 6/2003 | Fox et al. |
| 6,584,497 B1 | 6/2003 | Case et al. |
| 6,587,841 B1 | 7/2003 | DeFrancesco et al. |
| 6,590,587 B1 | 7/2003 | Wichelman et al. |
| 6,601,017 B1 | 7/2003 | Kennedy et al. |
| 6,601,018 B1 | 7/2003 | Logan |
| 6,601,233 B1 | 7/2003 | Underwood |
| 6,615,258 B1 | 9/2003 | Barry et al. |
| 6,626,953 B2 | 9/2003 | Johndrew et al. |
| 6,629,266 B1 | 9/2003 | Harper et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,687,817 B1 * | 2/2004 | Paul .............................. 713/1 |
| 6,725,231 B2 | 4/2004 | Hu et al. |
| 6,820,088 B1 | 11/2004 | Hind et al. |
| 6,920,467 B1 | 7/2005 | Yoshimoto |
| 6,928,488 B1 | 8/2005 | de Jong et al. |
| 6,934,934 B1 | 8/2005 | Osborne, II et al. |
| 2001/0020255 A1 | 9/2001 | Hofmann et al. |
| 2001/0029604 A1 | 10/2001 | Dreyband et al. |
| 2002/0004912 A1 | 1/2002 | Fung |
| 2002/0010867 A1 | 1/2002 | Schaefer et al. |
| 2002/0046239 A1 | 4/2002 | Stawikowski et al. |
| 2002/0055804 A1 | 5/2002 | Betawar et al. |
| 2002/0062475 A1 | 5/2002 | Iborra et al. |
| 2002/0065814 A1 | 5/2002 | Okamoto et al. |
| 2002/0069156 A1 | 6/2002 | Adam et al. |
| 2002/0069192 A1 | 6/2002 | Aegerter |
| 2002/0078115 A1 | 6/2002 | Poff et al. |
| 2002/0103725 A1 | 8/2002 | Martin et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124113 A1 | 9/2002 | Gargya et al. |
| 2002/0129096 A1 | 9/2002 | Mansour et al. |
| 2002/0133579 A1 | 9/2002 | Bernhardt et al. |
| 2002/0133593 A1 | 9/2002 | Johnson et al. |
| 2002/0133757 A1 | 9/2002 | Bertram et al. |
| 2002/0138571 A1 | 9/2002 | Trinon et al. |
| 2002/0143721 A1 | 10/2002 | Charlet et al. |
| 2002/0143819 A1 | 10/2002 | Han et al. |
| 2002/0143929 A1 | 10/2002 | Maltz et al. |
| 2002/0144101 A1 | 10/2002 | Wang et al. |
| 2002/0147857 A1 | 10/2002 | Sanchez, II et al. |
| 2002/0147961 A1 | 10/2002 | Charters et al. |
| 2002/0162090 A1 | 10/2002 | Parnell et al. |
| 2002/0165754 A1 | 11/2002 | Tang et al. |
| 2002/0178191 A1 | 11/2002 | Sielken |
| 2002/0178434 A1 | 11/2002 | Fox et al. |
| 2002/0188765 A1 | 12/2002 | Fong et al. |
| 2002/0188928 A1 | 12/2002 | Szpak et al. |
| 2002/0194370 A1 * | 12/2002 | Voge .......................... 709/239 |
| 2003/0004848 A1 | 1/2003 | Hellerstein et al. |
| 2003/0009323 A1 | 1/2003 | Adeli |
| 2003/0018952 A1 | 1/2003 | Roetzheim |
| 2003/0028555 A1 | 2/2003 | Young et al. |
| 2003/0033121 A1 | 2/2003 | Chen et al. |
| 2003/0033159 A1 | 2/2003 | Altomare |
| 2003/0033586 A1 | 2/2003 | Lawler |
| 2003/0036809 A1 | 2/2003 | Landman et al. |
| 2003/0041000 A1 | 2/2003 | Zajac et al. |
| 2003/0046317 A1 | 3/2003 | Cseri et al. |
| 2003/0050897 A1 | 3/2003 | Altomare |
| 2003/0065644 A1 | 4/2003 | Horman et al. |
| 2003/0069907 A1 | 4/2003 | Moreau et al. |
| 2003/0077559 A1 * | 4/2003 | Braunberger et al. ........ 434/322 |
| 2003/0084067 A1 | 5/2003 | Obiaya |
| 2003/0093574 A1 | 5/2003 | Fablet et al. |
| 2003/0097383 A1 | 5/2003 | Smirnov et al. |
| 2003/0110331 A1 * | 6/2003 | Kawano et al. ................ 710/58 |
| 2003/0120539 A1 | 6/2003 | Korium et al. |
| 2003/0144868 A1 | 7/2003 | MacIntyre et al. |
| 2003/0160813 A1 | 8/2003 | Raju |
| 2003/0188290 A1 | 10/2003 | Corral |
| 2003/0196190 A1 | 10/2003 | Ruffolo et al. |
| 2003/0206564 A1 * | 11/2003 | Mills et al. ................... 370/528 |
| 2003/0212518 A1 | 11/2003 | DAEAlessandro et al. |
| 2003/0217033 A1 | 11/2003 | Sandler et al. |
| 2003/0225662 A1 | 12/2003 | Horan et al. |
| 2003/0225663 A1 | 12/2003 | Horan et al. |
| 2004/0107183 A1 | 6/2004 | Mangan |
| 2004/0230587 A1 | 11/2004 | Doddington |
| 2005/0030555 A1 | 2/2005 | Phenix et al. |
| 2005/0071807 A1 | 3/2005 | Yanai |

FOREIGN PATENT DOCUMENTS

| | | |
|---|---|---|
| WO | 01/63529 | 8/2001 |
| WO | 01/74043 | 10/2001 |
| WO | 02/46916 | 6/2002 |
| WO | 02/046980 | 6/2002 |
| WO | 03/001373 | 1/2003 |

OTHER PUBLICATIONS

Hilbert; Hilbert, et al., An Approach to Large Scale Collection of Application Usage Data over the Internet, Software Engineering 1998, Proceedings of the 1998 International Conference, Abstract, Apr. 1998.

Quantitative Monitoring of Software Development by Time-Based and Interchekpoint Monitoring, Software Engineering Journal, vol. 5, Iss. 1, pp. 43-49, Abstract, Jan. 1990.

Sammet; Beginning of 4.6 Software Evaluation, Tests and Measurements and RMF I/O Time Validation, Association of Computing Machinery, p. 519 , Nov. 1981.

Duggan; 2.40 General - Reviews and Abstracts, SPI Database of Software Technologies, pp. 1-5, Feb. 1, 1974.

Agostini et al.; A Light Workflow Management System Using Simple Process Models, Cooperation Technologies Laboratory, Disco-University of Milano-Bicoca, Aug. 2000.

Muehlen; Business Process Automation and Workflow in the Financial Industry, CSK Software AG, Version 3, pp. 1-37, Sep. 10, 2003.

Georgakopoulos et al., An Overview of Workflow Management: From Process Modeling to Workflow Automation Infrastructure, Kluwer Academic Publishers, Boston, Distributed Parallel Databases, vol. 3, pp. 119-153, 1995.

Rennhackkamp; One for the Road: Sybase AES Adaptive Server Anywhere 6.0, M&T Publishing Inc., Section No. 10, vol. 11, p. 55, ISSN. 1041-5173, Sep. 1998.

McClanahan; Powerbuilder3.0, M&T Publishing Inc., vol. 6, No. 11, p. 57, ISSN. 1041-5173, Oct. 1993.

Unknown; Conjuring up COM Through Scripting, p. 14, Jul. 2000.

Quantum SPC/DC Script File (.TDF) Definition Instruction Guide, ASI Data Myte Inc., Version 2.4, pp. 2-14, 2004.

Myers; Scripting Graphical Applications by Demonstration, Human Computer Interaction Institute, Carnegie Mellon University, www.cs.cmu.edu/bam, pp. 1-8, Apr. 1998.

Ousterhoust; Scripting Higher Level Programming for the 21st Century, Sun Microsystems Laboratories, Draft #2, pp. 1-14, May 10, 1997.

OS/2EE Database Manager SQLJRA Remote Protocol, IBM Corporation, IBM TDB N10-93, pp. 33-36, Jan. 1, 1993.

Code Generation for Database Applications, IBM Corporation, pp. 1-3, Mar. 1, 2002.

Hudeponhl et al.; Integrating Metrics and Models for Software Risk Assessment, the Seventh International Symposium on Software Reliability Engineering (ISSRE '96), p. 93, Oct. 30, 1996.

Wohlin et al.; Understanding the Sources of Software Defects: a Filtering Approach, 8th International Workshop on Program Comprehension (IWPC '00), p. 9, (Abstract), Jun. 10, 2000.

Mohapatra et al.; Defect Prevention Through Defect Prediction: a Case Study at Infosys, Nov. 2001.

Basili et al.; Understanding and Predicting the Process of Software Maintenance Releases, 18th International Conference on Software Engineering (ICSE '96), Mar. 25-29; 464; (Abstract), Mar. 1996.

Dolev, et al.; An Integrated Architecture for the Scalable Delivery of Semi-Dynamic Web Content, Proceedings of the Seventh International Symposium on Computers and Communications, IEEE, 2002.

Betwixt: Turning Beans into XML, Apache Software Foundation, Archived Jun. 20, 2002 at <http://web.archive.org/web/20020620000410/http://Jakarta.apahce.org.commons/betwixt/>, p. 1 of 1, Nov. 13, 2005.

Castor: Using Castor XML, Exolab Group, Archived Aug. 27, 2001 at <http://web.archive.org/web/2001101955934/http://www.castor.org/xml-framework.html>, Retrieved from the Internet on Nov. 11, 2005.

Campione, et al.; Special Edition Using Java Tutorial, Third Edition: a Short Course on the Basics, Addison Wesley Professional ISBN: 0201-70393-9, 21 pages from Chapter 5, Dec. 28, 2000.

Pitt and McNiff; Java, RMI: the Remote Method Inovocation Guide, Addison Wesley Professional, ISBN: 0201-70043-3, Section 3.5, 3 pages, Jul. 2001.

Hamilton; Javabeans, Sun Microsystems, Chapter 8, Aug. 8, 1997.

Reinhart; Liability Management: a New Tool for Financial Consultants, Financial Consultant, vol. 1, No. 3, pp. 7-11, Fall/Winter 1996, ISSN 1091-644X, Dialog File 15, Accession No 01395382.

XML Schema Part 0 Primer-W3C Working Draft, W3C, Feb. 2000, Retrieved from the Internet on Nov. 18, 2005 at –http://www.w3.org/tr/2000/wd-xmlschema-0-20000225/>, 42 pages.

Frank M. Carrano, et al.; Frank M. Carrano, et al., Data Abstraction and Problem Solving with C++, Aug. 1998, Addison-Wesley, Chapter 2.

Brodkin; Brodkin, Use XML Data Binding to do Your Laundry, Retrieved from the Internet on May 19, 2006, Acessed and Printed From the Internet on May 19, 2006 at http://www.javaworld.com/javaworld/jw-12-2001/jw-1228-jaxb.html.

McConnell; Gauging Software Readiness With Defect Tracking; IEEE; May/Jun. 1997.

Programmer's Guide; Monitor Client Library 12.5; Document ID 32865:01-1250-01, May 2001.

Yu, et al.; An Analysis of Several Software Defect Models; IEEE Transactions on Software Engineering, vol. 14., No. 9; Sep. 1988.

* cited by examiner

METHOD USING CONTROL INTERFACE TO SUSPEND SOFTWARE NETWORK ENVIRONMENT RUNNING ON NETWORK DEVICES FOR LOADING AND EXECUTING ANOTHER SOFTWARE NETWORK ENVIRONMENT

CROSS REFERENCE TO RELATED APPLICATIONS

This application claims the benefit of U.S. Provisional Application Ser. No. 60/444,973, "A Method for Software Suspension in a Networked Computer System", filed Feb. 3, 2003. The 60/444,973 application is incorporated by reference herein.

FIELD OF THE INVENTION

This invention relates to a method for suspending a networked computer system. The method is particularly useful in suspending a computer network for efficient testing of software.

BACKGROUND OF THE INVENTION

Most business and financial institutions use computer systems that exploit the power of computer networking. By networking, individual computers can effectively increase their storage and processing ability, as well as gain access to processed data and live data streams. Such networks range in size from a few computers on a local area network (LAN) in a single office to hundreds or perhaps even thousands of computers spanning many offices and locations. These networks range in size from those confined to a single organization (Intranets) to those built on the global Internet.

To achieve the best utilization of the networked environment, organizations employ complex suites of software. Typically these suites are a mix of commercial software packages, customized commercial software, and software written entirely in house. For example, in a financial trading environment, traders can use desktop computers to view current market prices, to analyze various markets and instruments, and to buy and sell financial instruments. Teams of computer specialists including systems analysts and computer programmers write, integrate, and manage the systems of computer programs that create a financial institution's trading software environment.

These complex suites of software need to be periodically updated or replaced. This need may arise from changed business practices, or the availability of faster software packages or packages with new enhanced features. Any benefits that can be obtained from the installation of new software must be balanced against the risk of making changes on an otherwise properly operating network. Such changes can cause intermittent or event total network failure. Network failures can cause organizations to suffer large financial losses, such as lost trades in a financial instrument trading environment.

Rather then risk catastrophic network failure during testing, many institutions invest in relatively large networks of computers to create a "safe" simulation environment for testing complex software systems as thoroughly as practical. Networks comprising tens or hundreds of computers, including servers and client terminals, are often dedicated solely to testing complex software. Such systems can cost tens of millions of dollars and approximate or match the size and resources of some of an organization's production network systems.

While relatively safe, testing on the simulation network is not efficient. This is because each new software package is typically tested one at a time. Test runs are often paused for debugging and software re-writes. During the pause times, the test network remains idle. It is not practical to terminate a particular test and restart the system for other tasks because then all of the test time before termination would need to be repeated. The problem is that there is currently no process for suspending an entire network of computers to allow it to temporarily stand in for another entirely different network software environment, or to temporarily take over the software environment of an operational network in an emergency.

What is needed is a method to suspend a complex software testing environment in an orderly way so as to completely free the test network to run another test, or even to momentarily commandeer the test network to run a production processing environment in the event of a necessary shutdown or unanticipated failure of an equivalent production system, with the ability to seamlessly resume the original testing environment after the network resources have been returned.

SUMMARY OF THE INVENTION

According to the inventive method, a test network, including its software environment, is suspended in a manner that completely preserves the previous running environment and frees the network to perform other tasks for a period of time, and then to resume the original test as if it had never been interrupted. The method suspends a computer network that is running a test of a first software environment. It suspends the first software environment by a software suspension and then runs a second software environment on the computer network. At the completion of the run of the second software environment, the first software environment can be resumed, as if it had not been interrupted. A sequence of steps allows for the orderly shutdown and persists the entire network's operating state at the time of suspension. These steps include notifying network devices of an impending take over, synchronizing device clocks and communications channels, handshaking by each device that it is ready to freeze its current state, writing device image data to non-volatile memory, and finally loading and running the new environment. After the take over, the method provides for a second orderly process to resume its initial testing environment including restarting the previous simulation as if it had never been interrupted. This is done by synchronizing all device clocks to the test environment time at take over, synchronizing communications channels, handshaking all devices ready, checking for the initial hardware configuration, reading the previously stored non-volatile memory, and loading and restarting the previous test environment.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale. It is also understood that all application code, other framework code, database programs, and data reside on computer readable media and run on one or more computer systems including standard computer components and operating systems as known in the art.

DESCRIPTION

According to the inventive method, a test network's software environment is suspended in a manner that completely retains the running environment at shut down and frees the network to perform other tasks for a period, and then resumes the test as if it had never been interrupted. Typically a first test is nearing a point at which there is a planned suspension and the party that will follow with a second test might pre-coordinate, as by telephone, with the party running the first test before initiating the suspension process. It should be noted however, that this preliminary agreement by human contact, while beneficial, is absolutely not necessary.

Figure 1:
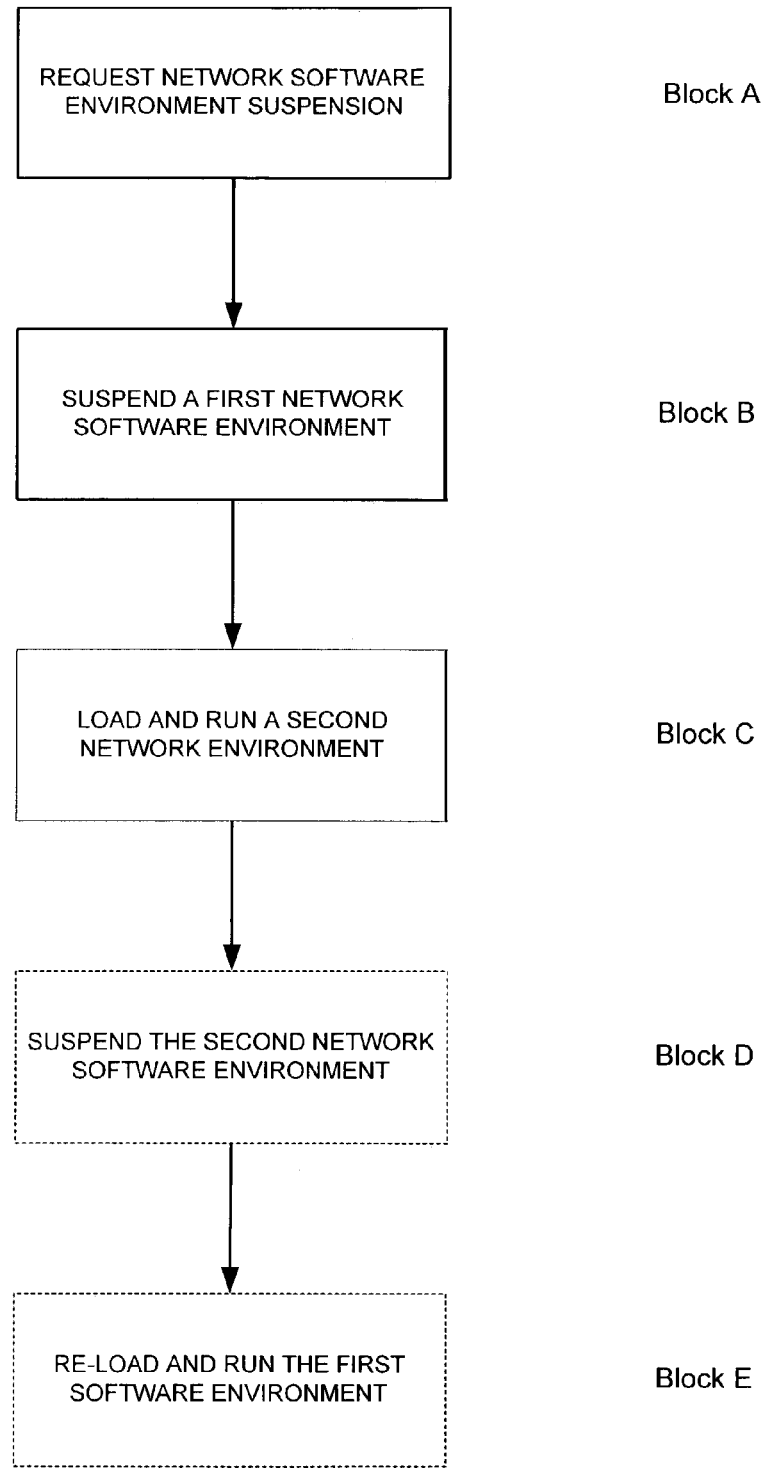
FIG. 1 is a simplified block diagram showing an overview of the method of software network suspension.

The basic sequence of steps allows for the orderly shutdown and preservation of the entire network's operating state at the time of suspension are shown by the flow chart of FIG. 1, "Network Suspension". First, a request to suspend is sent to all network hardware to be suspended as shown by block A. The request can be sent by a common "control interface" 401 as shown in hardware FIG. 4. Then the network is suspended through a series of steps explained below, as shown by block B. In block C, a second software environment is loaded and run. Then in block D, the second software environment is suspended as explained in more detail below, and finally the original software environment is restarted, as if it had never been interrupted, in block E. It can now be seen that during the time of suspension, time is suspended for the first environment. But, this is not problematic because the first software test environment runs at a simulated time past. Therefore if that time falls farther behind the present "real" time, there is no deleterious effect on the test.

Figure 2:
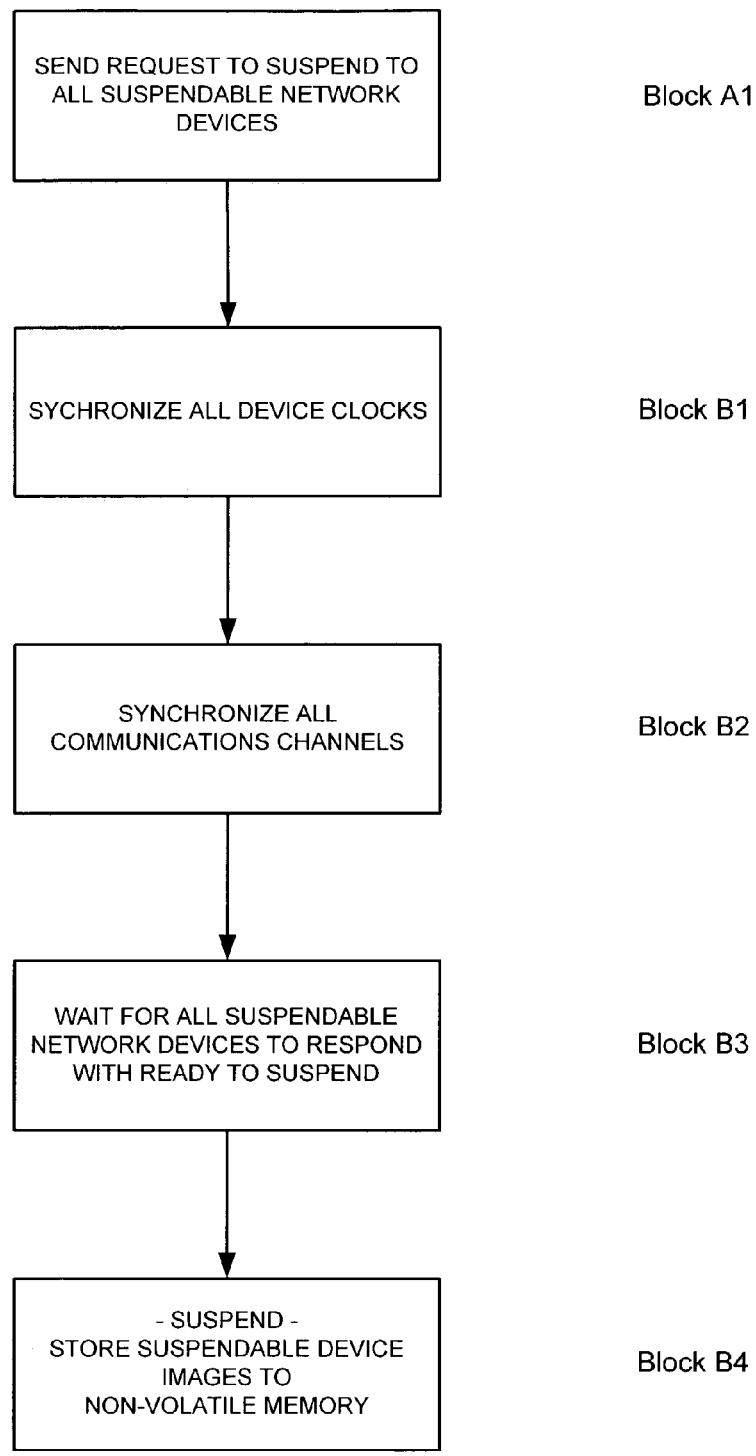
FIG. 2 is a block diagram showing the suspension of a first running software network environment.

The detailed steps necessary for a successful network software suspension are shown in FIG. 2. The lettered and numbered blocks of FIG. 2 further expand on the basic lettered steps of FIG. 1. Block A1 shows the initiation of a network suspension caused by sending the "request to suspend" command to all suspendable network devices. The request to suspend command can be sent manually by a system manager, or automatically in the case where one network is authorized and enabled to "commandeer" another network. In block B1, all devices receive a command to synchronize their clocks. This can be by sending a "falling edge" electronic signal for example, and can synchronize at the level of an individual clock pulse, but more likely would set the time clocks to all agree on the current time to some precision of, for example, 1 millisecond. Similarly this command could cause all devices to set their time clocks to some external standard available to the network, such as, but not limited to, international low frequency time standards (WWVB in the U.S.) or the global positioning satellite (GPS) time.

In Block B2, all communications channels are synchronized and halted. Communication channel shutdown is generally done at a "sub device" level whereby communication protocols assure that no data is lost. The purpose of communications shutdown is to partition and assign partially transmitted data to the sending or receiving device for storage to preserve the partially completed exchange during suspension. Bytes not yet transmitted become part of the "image" of the transmitting device's buffers and memory and bytes already received become part of the receiving device's buffers and memory. Alternatively, a portion of partially received data could be flushed on the receiving end and a pointer established to retransmit an entire byte, packet, or other logical element of data. Various network devices will take varying times to complete the time synchronization and communications channel shutdown process.

In block B3, devices respond to the suspension control interface reporting that they are ready to shutdown. The report indicates that the device has successfully synchronized its clock and halted its communications channels according to protocol. The control interface waits for all devices to report affirmatively they are "ready to freeze". When this handshaking process is complete, the control interface sends the "store image" command to all network devices.

The store image command, as illustrated in block B4, can be viewed as the "freeze" or moment of suspension in time when the previously running network software environment enters a state of suspended animation. The preservation process is accomplished by writing all device buffers, registers, and volatile memory to non-volatile memory. The device images can be saved to suitable areas of non-volatile memory on each device (not shown), or to a common non-volatile suspension memory 406 as shown in hardware FIG. 4. Hard disk drives can be particularly suitable for this task, other forms of non-volatile memory as know in the art such as semiconductor memory, bubble memory, EPROM, and EEPROM, can similarly be used. Finally, all device volatile memory is cleared and all buffers are flushed in preparation for loading a second software environment.

FIG. 1, block C, shows the second software environment loaded onto the network. The second environment is typically a second test environment that will use the network resources either for a fixed granted period of time, or until the first test is in a suitable condition to resume running, or until the second test is complete. This embodiment is a typical application of the suspension method, as it provides a complex and costly resource for near continuous use. An important advantage of the suspension system will be seen below, in that the original test can be seamlessly resumed in exactly the same state as when it was suspended.

Figure 3:
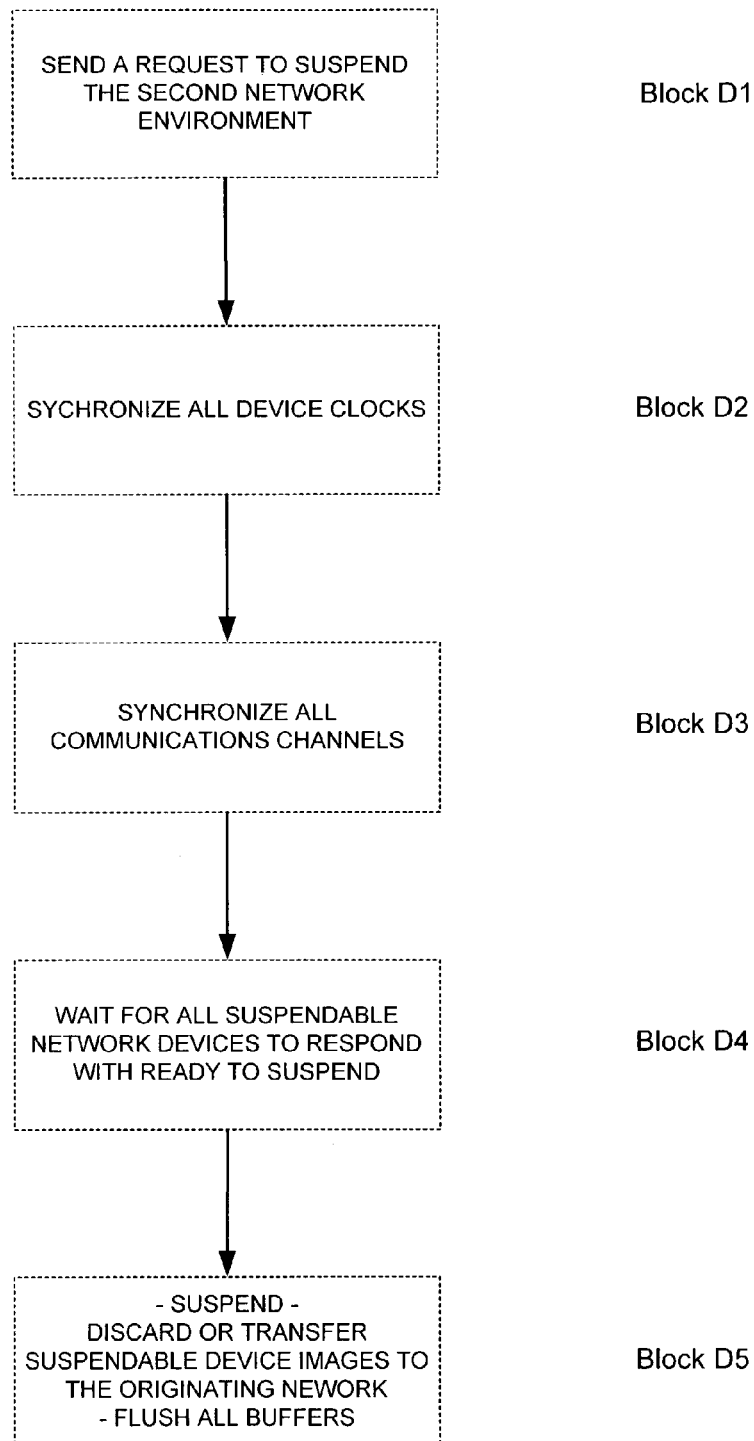
FIG. 3 is a block diagram showing the suspension of a second running software network environment.

Following the running of a second test environment to completion, or until the first test is ready to resume, the second environment can be shut down or suspended. The case where the second process was the running of a production network is a special case and is further described below. FIG. 1, block D shows the suspension of the second software network environment. FIG. 3 shows the block D process in more detail according to the steps D1 through D5.

According to FIG. 3, block D1, a request to suspend is either manually or automatically sent by the control interface 401, or by other messaging techniques, to suspend the second software network environment. As in the initial suspension, all network device clocks are synchronized in block D2 and all device communications channels are synchronized in block D3. Then all suspendable network devices hand shake with the control interface, by sending a "ready to suspend" signal back to the control interface.

In block D5 the second software network environment can be suspended for later running, or if completed, simply terminated. If it is desired to suspend the second network environment, its device images are saved to non-volatile memory for later use. Then the network devices are reset, their memory and buffers flushed, and the initially suspended first software network environment can be reloaded and run.

Figure 4:
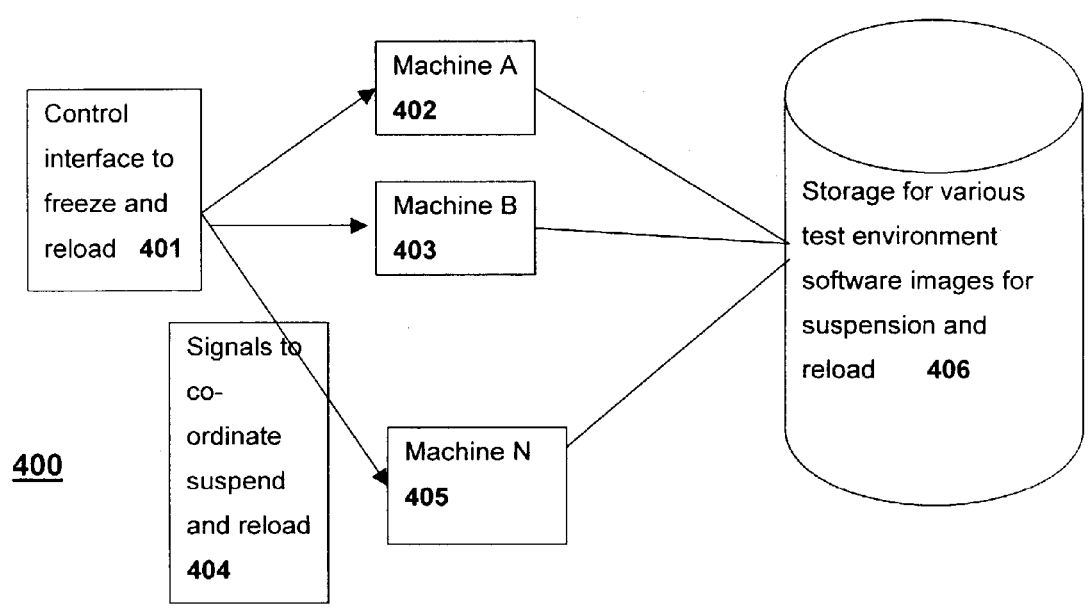
FIG. 4 is a simplified block diagram showing a hardware system suitable for performing software network suspension.

FIG. 4 shows a block diagram of a suitable network hardware environment to perform the inventive method. Here control interface 401 supervises the suspension process for the network comprising machines A 402, B 403 through N 405. In the embodiment shown, it is envisioned that network device images can be saved to common non-volatile memory storage area 406. In another embodiment (not shown), device images could be saved within a dedicated non-volatile memory area within each device. That memory area would remain unaffected by a device reset, clear, or suspend command.

The Un-Interruptible Network:

Alternatively, the complex network normally used for testing, may be "commandeered" by an organization's production environment in the event of a fatal failure of the production network. In this embodiment, the suspension process provides a network backup, which is analogous to the function served by an un-interruptible power supply. Here the critical production network is failing, or has failed. In the most desirable case, the failing network was able to preserve an image for re-start. In a worst-case scenario, the image of the failing production system is corrupted or not available.

By manual operator intervention, or more preferably by automatic signaling, a predetermined test network can be made to immediately terminate its testing process and to go into network software suspension. The test network can then load the production environment. Ideally, an image of the production environment can be loaded before running, or if no image is available, the production environment can be initialized in some predefined state perhaps using data and records normally persisted in the normal running environment.

While this technique can be used to quickly replace a failed production network environment, it is envisioned to be useful to carry the production network for a short period of outage and then to release the test network to seamlessly resume the first testing environment. In a best-case scenario, it is known ahead of time that the production environment has to go down for a period ranging from minutes to hours. The test environment can then be suspended and taken to the state of Block C. Then the production environment can be suspended and immediately restarted on the now available test network. In this case, when the production network is ready to resume, it can similarly be made to enter a fully ready state, and then the production environment on the test network can be suspended and immediately loaded and run on the now waiting production network.

It should be noted that when suspending a network for a second test, the transition can be perfect in that the second test, as the first one, runs in simulation time, a time in history. But, the suspension process when serving as a backup to a real time production system can be problematic in that if the production system failed abruptly, real time activity from the time of production network failure to the time of test network suspension can be lost.

I claim:

1. A method of suspending a computer network that is communicating with a plurality of network devices including clocks and running a first software environment, comprising the steps of:
   providing a control interface to control the suspension;
   sending a request to suspend to the network devices;
   synchronizing the clocks the network devices;
   synchronizing the communications channels of the network devices;
   using the control interface to control the suspension;
   handshaking between a control interface and the network devices by the plurality of network devices transmitting a signal to the control interface that the devices are ready to be suspended;
   suspending the first software network environment;
   saving the first software network devices image data to non-volatile memory; clearing the network devices and flushing device buffers;
   loading a second software network environment; and running the second software network environment.

2. The method of claim 1 further comprising the steps of
   suspending the second software network environment according to the steps of claim 1;
   loading the image data of the first software network environment that was suspended; and
   running the first software network environment.

3. The method of claim 1 wherein the second software network environment is a production system.

4. A method of software testing and computer network suspension of a computer network that is communicating over communications channels with a plurality of network devices having internal clocks and running a first software environment, comprising the steps of:
   providing a control interface to control the suspension;
   sending a request to suspend to the network devices that are running a software simulation prior to suspension;
   synchronizing the clocks of the network devices;
   synchronizing the communications channels of the network devices;
   controlling the suspension of the first software network environment with a control interface;
   handshaking between a control interface and the network devices by the plurality of network devices transmitting a signal that they are ready to be suspended;
   suspending the first software network environment;
   saving the first software network devices image data to non-volatile memory;
   clearing the network devices and flushing device buffers;
   loading a second software network environment; and
   running the second software network environment.

5. The method of claim 4 further comprising the steps of:
   suspending the second software network environment according to the steps of claim 1;
   loading the image data of the first software network environment that was suspended, and
   running the first software network environment.

6. The method of claim 4 wherein the step of loading a second software network environment comprises loading a second software network environment.

7. A method of suspending a network comprising the steps of claim 4 wherein loading a second software network environment comprises the step of loading a second software production network environment such that the network serves for a time as a redundant network to a production network.

* * * * *